US011373401B2

(12) United States Patent
Olsson et al.

(10) Patent No.: US 11,373,401 B2
(45) Date of Patent: Jun. 28, 2022

(54) DETECTION OF DISCREPANCIES BETWEEN IMAGED MARITIME VESSELS AND RECEIVED IDENTIFICATION DATA

(71) Applicant: FLIR Systems AB, Täby (SE)

(72) Inventors: Stefan F. Olsson, Stockholm (SE); Jorgen Lundberg, Osterskar (SE); Veronica Eriksson, Taby (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 16/430,575

(22) Filed: Jun. 4, 2019

(65) Prior Publication Data

US 2019/0377947 A1    Dec. 12, 2019

Related U.S. Application Data

(60) Provisional application No. 62/683,466, filed on Jun. 11, 2018.

(51) Int. Cl.
| | |
|---|---|
| *G06V 20/20* | (2022.01) |
| *G08B 21/00* | (2006.01) |
| *B63B 35/40* | (2006.01) |
| *B63B 35/00* | (2020.01) |
| *G06V 20/64* | (2022.01) |

(52) U.S. Cl.
CPC .............. *G06V 20/20* (2022.01); *B63B 35/00* (2013.01); *B63B 35/40* (2013.01); *G06V 20/64* (2022.01); *G08B 21/00* (2013.01)

(58) Field of Classification Search
CPC ............................ G06K 9/0063; H04N 7/181
USPC .................... 342/41, 454, 386; 340/541, 984
See application file for complete search history.

(56) References Cited

U.S. PATENT DOCUMENTS

| | | | |
|---|---|---|---|
| 2013/0200207 A1* | 8/2013 | Pongratz | B64C 37/02 244/2 |
| 2015/0089423 A1 | 3/2015 | Tenetylo | |
| 2016/0217692 A1* | 7/2016 | Lee | G08G 3/02 |
| 2019/0163984 A1* | 5/2019 | Shinohe | G06T 7/0002 |

* cited by examiner

*Primary Examiner* — Kiet M Doan
(74) *Attorney, Agent, or Firm* — Haynes and Boone, LLP (57) ABSTRACT

Various techniques are disclosed for the detection of discrepancies between imaged maritime vessels and received identification information. In one example, a method includes capturing an image of a maritime vessel and processing the image to extract information associated with the vessel. The method also includes receiving automatic identification system (AIS) data, comparing the extracted information to the AIS data, and generating an alarm in response to a discrepancy detected by the comparing. Additional methods, systems, and devices are also provided.

14 Claims, 6 Drawing Sheets

DETECTION OF DISCREPANCIES BETWEEN IMAGED MARITIME VESSELS AND RECEIVED IDENTIFICATION DATA

CROSS REFERENCE TO RELATED APPLICATION

This application claims the benefit of and priority to U.S. Provisional Patent Application No. 62/683,466 filed Jun. 11, 2018 and entitled "DETECTION OF DISCREPANCIES BETWEEN IMAGED MARITIME VESSELS AND RECEIVED IDENTIFICATION DATA," which is incorporated herein by reference in its entirety.

TECHNICAL FIELD

The present invention relates generally to the monitoring of maritime vessels and, more particularly, to image-based identification techniques for such vessels.

BACKGROUND

Maritime vessels including various types of ships, boats, and other watercraft frequently travel to many worldwide destinations in support of commerce, transportation, and other purposes. In order to identify vessels remotely, the automatic identification system (AIS) has been developed. Vessels equipped to support AIS communications are able to transmit information such as vessel name, home port, geo-location, course, speed, and/or other information. Such AIS communications are transmitted wirelessly by the vessels and may be received by other vessels, monitoring stations, satellites, and/or other receivers. As a result, a given vessel may, in theory, be readily identified by local and remote entities.

However, existing AIS systems can be subject to misuse. In some cases, a vessel may be configured to transmit inaccurate or misleading information regarding its identity. For example, if the operator of a vessel does not wish to be accurately identified (e.g., in order to facilitate criminal activity), the vessel's AIS system may be configured to broadcast false information, such as a false vessel name or a false home port.

Unfortunately, existing AIS systems rely on the accuracy of broadcasted information and are generally unable to confirm the veracity of AIS transmissions. As a result, there is a need for an improved approach that can detect inaccuracies in AIS data.

SUMMARY

In accordance with various embodiments discussed herein, AIS monitoring systems and related methods are provided to detect discrepancies between vessel information extracted from captured images and AIS data received from the vessel itself and/or received from other sources. In some embodiments, a multisensor system comprising an imager and additional sensors may be used to detect the presence of a vessel. Following detection, various pan, tilt, and/or zoom mechanisms may be operated to adjust the orientation of a camera of the multisensor system automatically in order to substantially fill a field of view of the camera with the detected vessel.

In some embodiments, one or more captured images may be processed to extract information associated with the detected vessel and compared with AIS data to detect a discrepancy (e.g., deviation) between the extracted information and the AIS data, and trigger alarms in response thereto. The extracted information and the AIS data may be combined and presented to a user for review. Additionally, the one or more captured images, the extracted information, the AIS data, and/or additional information may be stored to provide a record of the discrepancy.

In one embodiment, a method includes capturing an image of a maritime vessel; processing the image to extract information associated with the vessel; receiving automatic identification system (AIS) data; comparing the extracted information to the AIS data; and generating an alarm in response to a discrepancy detected by the comparing.

In another embodiment, a system includes a camera configured to capture an image of a maritime vessel; a processor; and a memory configured to store instructions executable by the processor to configure the processor to perform a method comprising: process the image to extract information associated with the vessel, receive automatic identification system (AIS) data, compare the extracted information to the AIS data, and generate an alarm in response to a discrepancy detected by the comparing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
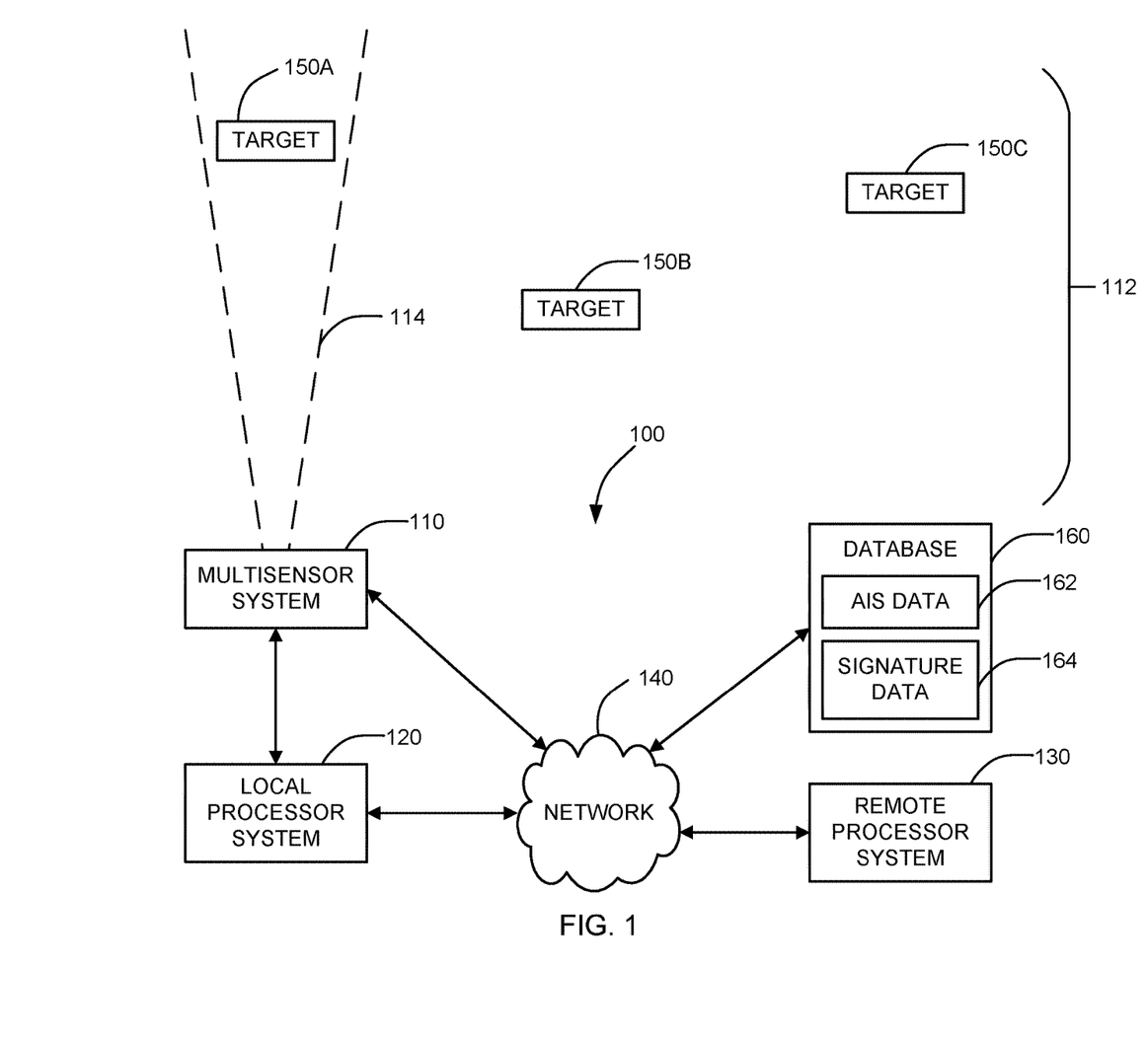
FIG. 1 illustrates a block diagram of a monitoring system in accordance with an embodiment of the disclosure.

FIG. 1 illustrates a monitoring system 100 in accordance with an embodiment of the disclosure. System 100 captures images and/or signals from one or more targets 150 distributed throughout a target area 112. System 100 processes these images and signals to detect targets 150 and identify discrepancies between information extracted from the captured images and other information associated with the targets to alert a user of such discrepancies.

System 100 may be particularly configured for monitoring maritime activity. As such, target area 112 may be any environment where maritime vessels pass through such as, for example, a harbor, river, canal, coastal region, open ocean, and/or other maritime environments. Accordingly, monitoring system 100 and/or its various components may be positioned on land to monitor a nearby maritime environment and/or positioned within the maritime environment on a fixed or mobile platform (e.g., on a stationary structure or on a watercraft).

Targets 150 may be any type of object that may be present in the target area 112. For example, in the embodiments discussed herein, targets 150 are implemented as maritime vessels, however it will be appreciated that any type of object may be detected and monitored by system 100. Although three specific targets 150A, 150B, and 150C are shown, any number of targets 150 may be present.

As shown, monitoring system 100 includes a multisensor system 110, a local processor system 120, a remote processor system 130, and a database 160, all of which may be in communication with each other either directly and/or through one or more wired or wireless networks 140.

Multisensor system 110 may be implemented with a plurality of sensors capable of capturing images and/or signals from target area 112. For example, multisensor system 110 may include an imager with a field of view 114 that may be selectively directed toward different portions of target area 112.

Local processor system 120 and remote processor system 130 control the operation of multisensor system 110, receive captured images and signals from multisensor system 110, and perform various processing as discussed herein. In some embodiments, local processor system 120 may be positioned at the same physical location as multisensor system 110 in a local command and control center (e.g., local processor system 120 may be implemented as part of multisensor system 110 or in direct or networked communication therewith). In some embodiments, remote processor system 130 may be positioned at any location for remote interaction with multisensor system 110. Accordingly, in some embodiments, processing resources may be shared between local processor system 120 and remote processor system 130 as appropriate to manage the overall efficient and effective operation of system 100.

Database 160 stores AIS data 162 and signature data 164 used by system 100 in the monitoring of targets 150 as discussed herein. AIS data 162 may include information provided in AIS transmissions from targets 150 and/or other targets around the world. Accordingly, AIS data 162 may be a compilation of AIS data associated with many possible targets. AIS data 162 received from other sources (e.g., other monitoring systems and/or directly from vessels) may be provided to database 160 over network 140.

Signature data 164 may include unique information associated with specific known vessels. For example, signature data 164 may include images, shapes, three dimensional models, and/or any other information that may be used in the identification of a particular vessel.

Figure 2:
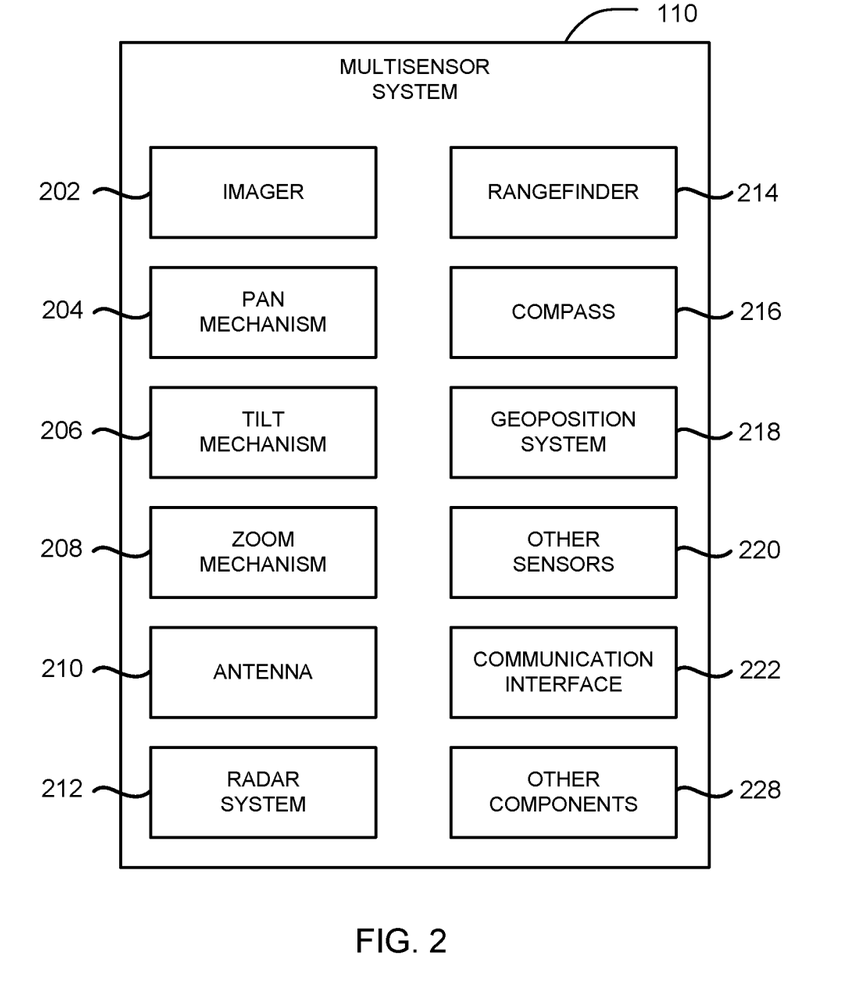
FIG. 2 illustrates a block diagram of a multisensor system in accordance with an embodiment of the disclosure.

FIG. 2 illustrates a block diagram of multisensor system 110 in accordance with an embodiment of the disclosure. Multisensor system 110 includes various components as shown in FIG. 2. Imager 202 may be implemented with a plurality of infrared, visible light, and/or other types of sensors to capture images of target scene 112 over field of view 114 (see FIG. 1). In various embodiments, a plurality of successive images may be captured to provide video images and/or multiple still images for further processing.

Pan mechanism 204 and tilt mechanism 206 selectively adjust an orientation of imager 202. For example, pan mechanism 204 and/or tilt mechanism 206 may be used to sweep field of view 114 of imager 202 throughout target area 112 (e.g., horizontally and/or vertically) to capture images of any of targets 150A, 150B, and 150C. In some embodiments, pan mechanism 204 and tilt mechanism 206 may be provided by a combined pan/tilt mechanism.

Zoom mechanism 208 selectively adjusts the proportion of field of view 114 that is filled by a target 150. By operating zoom mechanism 208, an image of a target 150 may be captured of sufficient resolution to extract data therefrom through appropriate image processing techniques.

Antenna 210 receives various signals from target area 112 or elsewhere. For example, in some embodiments, antenna 210 may receive AIS transmissions from various targets 150. In other embodiments, antenna 210 may receive other radio frequency signals comprising any type of data for use by system 100.

Radar system 212 detects the presence of one or more targets 150 in target area 112. For example, radar system 212 may detect the presence of any of targets 150A, 150B, and 150C even if they are currently outside the field of view 114 of imager 202.

Rangefinder 214 detects the relative distance between multisensor system 110 and targets 150. For example, in some embodiments, rangefinder 214 may be mounted with imager 202 on a structure oriented by pan mechanism 204 and tilt mechanism 206 to detect the distance of a particular target included in images captured by imager 202. In some embodiments, rangefinder 214 may be implemented as a laser rangefinder or any other appropriate device.

Compass 216 detects the current direction of the field of view 114 of imager 202 and/or any additional sensors or components of multisensor system 110. For example, in some embodiments, compass 216 may also be mounted with imager 202 on a structure oriented by pan mechanism 204 and tilt mechanism 206. As a result, the direction of a target captured in the field of view 114 of imager 202 may be determined relative to multisensor system 110.

Geolocation system 218 operates to detect the current geolocation (e.g., geoposition) of multisensor system 110. For example, in some embodiments, geolocation system 218 may be implemented as a global positioning system (GPS) receiver or other appropriate device configured to receive GPS signals or other positioning signals through antenna 210. In various embodiments, multisensor system 110 may be implemented in a fixed or mobile manner. In either case, geolocation system 218 may determine the current geolocation of multisensor system 110. Using this geolocation with target range data from rangefinder 214 and direction information from compass 216, system 100 may determine the geolocation of a target 150. In other embodiments, the geolocation of the target 150 may be determined based on the position of the target 150 detected by radar system 212 relative to the geolocation of multisensor system 110.

One or more other sensors 220 may be provided where appropriate for detecting additional phenomena as desired. Communication interface 222 may be implemented as any type of wired and/or wireless interface to communicate with the various components of system 100 directly and/or over network 140 using any desired protocols (e.g., Universal Serial Bus (USB), Ethernet, WiFi, Bluetooth, cellular, infrared, radio, and/or other protocols). Other components 228 may also be provided as appropriate to support additional operations of multisensor system 110 as desired.

Figure 3:
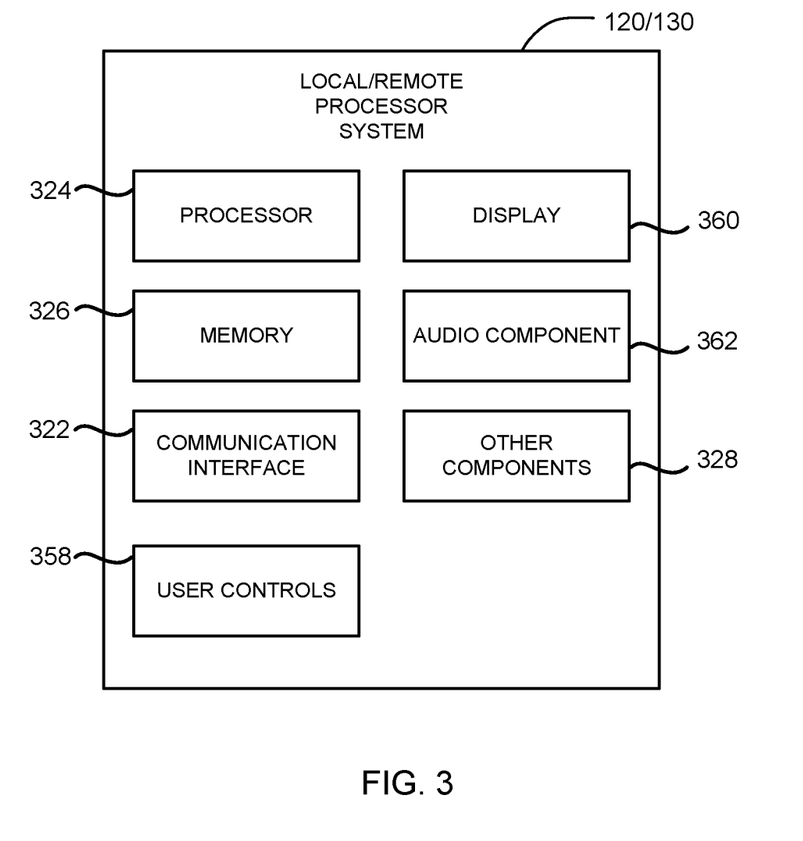
FIG. 3 illustrates a block diagram of a local or remote processor system in accordance with an embodiment of the disclosure.

FIG. 3 illustrates a block diagram of local processor system 120 or remote processor system 130 in accordance with an embodiment of the disclosure. In this regard, one or more of the features illustrated in FIG. 3 may be used to implement either or both of local processor system 120 and remote processor system 130.

Processor 324 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of multisensor system 110 and perform additional operations discussed herein. In this regard, processor 324 may execute machine readable instructions (e.g., software, firmware, or other instructions) stored in memory 226.

Memory 326 may be implemented as a machine readable medium storing various machine readable instructions and data. In some embodiments, memory 326 may be implemented as non-volatile memory (e.g., flash memory, hard drive, solid state drive, or others), volatile memory, or combinations thereof.

Local/remote processor system 120/130 may further include a communication interface 322 and other components 328 which may be implemented in the same or similar manner as corresponding components of multisensor system 110 as discussed.

Local/remote processor system 120/130 may further include user controls 358 which may be used to operate local processor system 120 in response to user commands. Various types of user controls 358 may be provided including, for example, a keyboard, mouse, trackpad, touchscreen, buttons, switches, and/or other controls as appropriate.

Local/remote processor system 120/130 may also include a display 360 which may be used to present images, visible alarms, and/or other information to the user. In some embodiments, display 360 may be a touchscreen also providing user controls 358.

Local/remote processor system 120/130 may also include an audio component 362 such as a speaker, buzzer, and/or other sound generating device. For example, audio component 362 may be used to provide audio information to the user such as an audible alarm.

Figure 4:
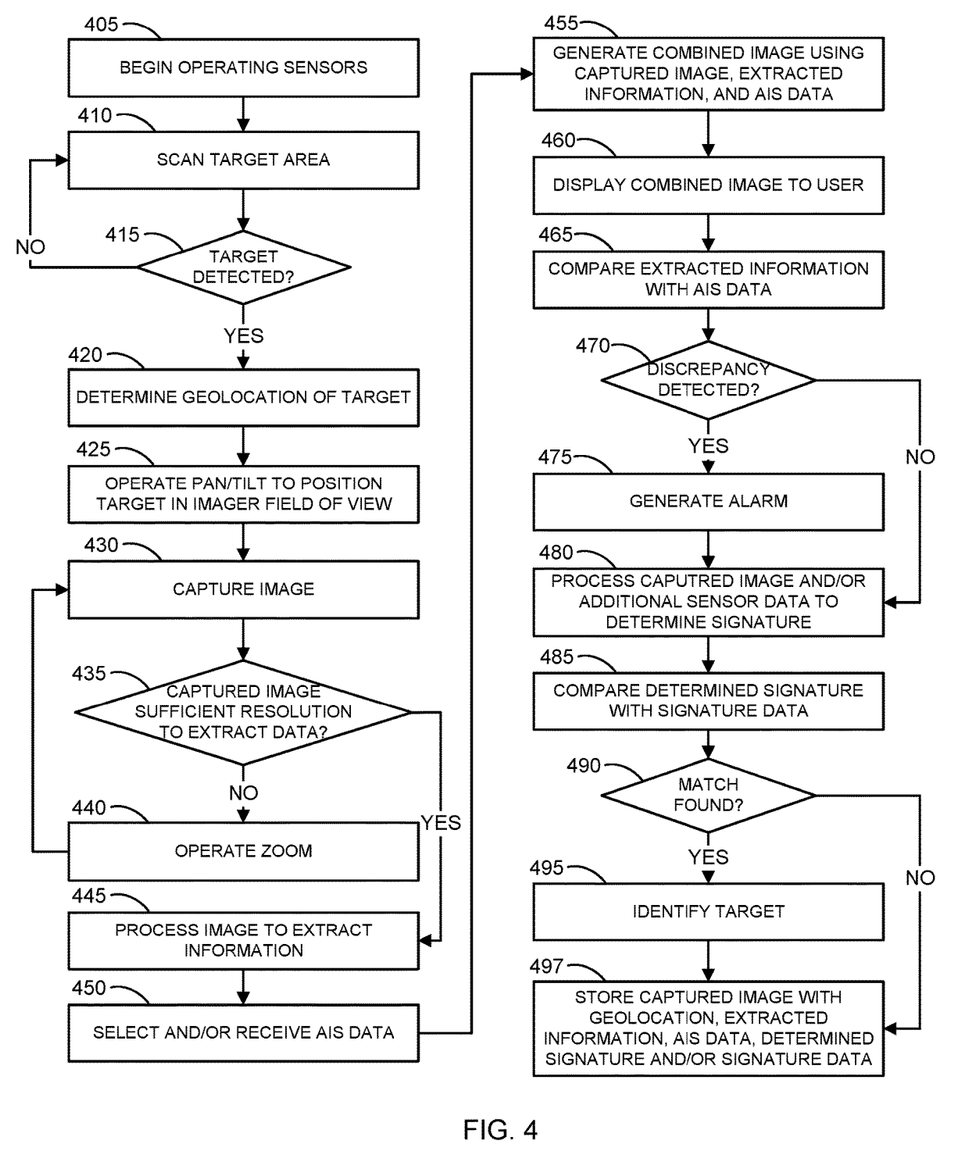
FIG. 4 illustrates a flow diagram of a process for detecting discrepancies between imaged targets and received AIS data in accordance with an embodiment of the disclosure.

FIG. 4 illustrates a flow diagram of a process for detecting discrepancies between imaged targets 150 and received AIS data in accordance with an embodiment of the disclosure. In various embodiments, the operations identified in FIG. 4 may be performed by one or more of the components of monitoring system 100. Although the process of FIG. 4 is generally discussed in the context of individual captured images, multiple images (e.g., still images and/or video images) may be used in any of the various operations where appropriate.

In block 405, processor 324 causes multisensor system 110 to begin operating its various sensors including imager 202, radar system 212, rangefinder 214, compass 216, geolocation system 218, and/or other sensors 220. For example, imager 202 may begin capturing images of target scene 112 in its field of view 114. In some embodiments, the captured images may be provided to processor 324 which stores them in a cyclic buffer within memory 326. For example, a recent set of images corresponding to a desired period of time (e.g., a specified number of seconds, minutes, hours, or days) may be stored and continuously or periodically updated such that a recent set of images of target area 112 are available for processing.

In block 410, processor 324 causes multisensor system 110 to begin scanning target area 112 to detect the presence of one or more targets 150. In some embodiments, block 410 may be performed by processor 324 operating radar system 212. In this regard, radar system 212 may transmit radar signals to target area 112 and receive reflections thereof from targets 150. If a target 150 is detected, radar system 212 may inform processor 324 through an appropriate communication.

In some embodiments, block 410 may be performed by processor 324 operating imager 202, pan mechanism 204, and/or tilt mechanism 206 while zoom mechanism 208 is configured for a wide zoom. Processor 324 may operate pan mechanism 204 and/or tilt mechanism 206 to sweep field of view 114 of imager 202 throughout target area 112 as discussed. During the sweep, imager 202 may repeatedly capture images of target area 112 which are received by processor 324. Also during block 410, processor 324 may process the captured images to determine whether any targets 150 are present in the images. In various embodiments, processor 324 may perform appropriate object-detection processing and/or other types of processing to identify targets 150 in the captured images.

In some embodiments, a plurality of targets may be identified in block 410. For example, in the case of FIG. 1, three possible targets 150A, 150B, and 150C may be identified. In some embodiments, block 410 may include a further target analysis performed by processor 324 to classify various types of targets 150 into different categories (e.g., ship, small watercraft, debris, and/or others). In this regard, processor 324 may select or ignore various targets 150 based on various criteria such as size, shape, category, and/or other factors. For example, in the case of scanning performed by radar system 212, processor 324 may choose to ignore a detected target that is outside of a desired size range. In the case of scanning performed by imager 202, processor 324 may choose to ignore a target 150 that is outside of a desired size range or exhibits an undesired shape. As a result of this further target analysis, processor 324 may avoid analyzing non-watercraft objects (e.g., such as debris), vessels that fall outside a desired shape of size (e.g., such as small watercraft that may not be of interest in some cases), and/or other types of targets as appropriate.

If a desired target is detected (block 415), then the process continues to block 420. Otherwise, the process returns to block 410 and the scanning continues. In this particular example, target 150A has been detected.

In block 420, processor 324 determines the geolocation (e.g., coordinates) of target 150A. For example, as discussed, system 100 may determine the geolocation of target 150A using the current geolocation of multisensor system 110, target range data from rangefinder 214, direction information from compass 216, and/or the position of the target 150 detected by radar system 212. In some embodiments, the geolocations of other detected targets (e.g., targets 150B and 150C) may also be determined for future processing and analysis.

In block 425, processor 324 operates pan mechanism 204 and/or tilt mechanism 206 to position the detected target 150A within the field of view 114 of imager 202 according to the geolocation determined in block 425. For example, in the case of radar-based detection or image-based detection, the field of view 114 of imager 202 may not have been directed precisely toward target 150A at the time of detection.

Figure 5:
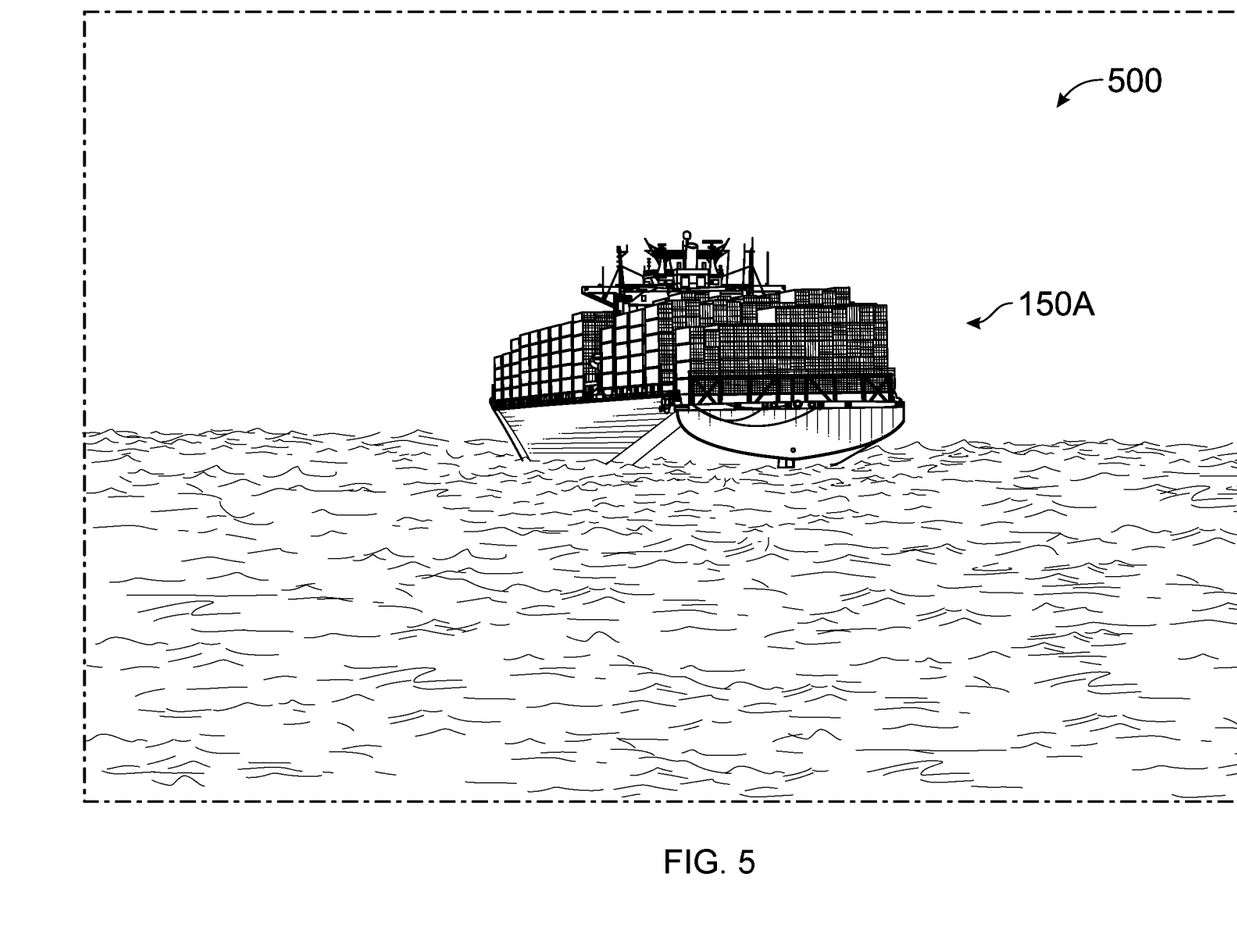
FIG. 5 illustrates a captured image in accordance with an embodiment of the disclosure.

In block 430, processor 324 operates imager 202 to capture an image of the detected target 150A. FIG. 5 illustrates an example image 500 captured in block 435 in accordance with an embodiment of the disclosure. As shown in FIG. 5, image 500 is an image of a vessel corresponding to target 150A. However, the vessel itself comprises only a portion (e.g., approximately 10 percent) of the overall image 500. As a result, although target 150A can be identified as a vessel, it may be difficult to discern identifying features of the target 150A. For example, the name and port of the vessel might not be easily extracted from image 500 due to the low resolution of the vessel within image 500.

In block 435, processor 324 reviews image 500 to determine whether it is of sufficient resolution to extract any useful information. Such review may include, for example: processing image 500 to attempt extraction of letters, numbers, or other indicia from the image 500; detecting the size of target 150A within image 500 relative to a remainder of the image; and/or other processing. If the resolution is sufficient, then the process continues to block 445. Otherwise, the process continues to block 440.

In some embodiments, block 435 may include additional image processing operations to improve the ability of processor 324 to extract useful information therefrom. Such processing may include, for example, noise filtering, super-resolution processing, turbulence mitigation, and/or other processing.

In block 440, processor 324 operates zoom mechanism 208 to increase the size of target 150A within the field of view 114 of imager 202. The process returns to block 430 where another image 500 is captured. Blocks 430, 435, and 440 repeat until the image resolution is sufficient and the process continues to block 445.

Figure 6:
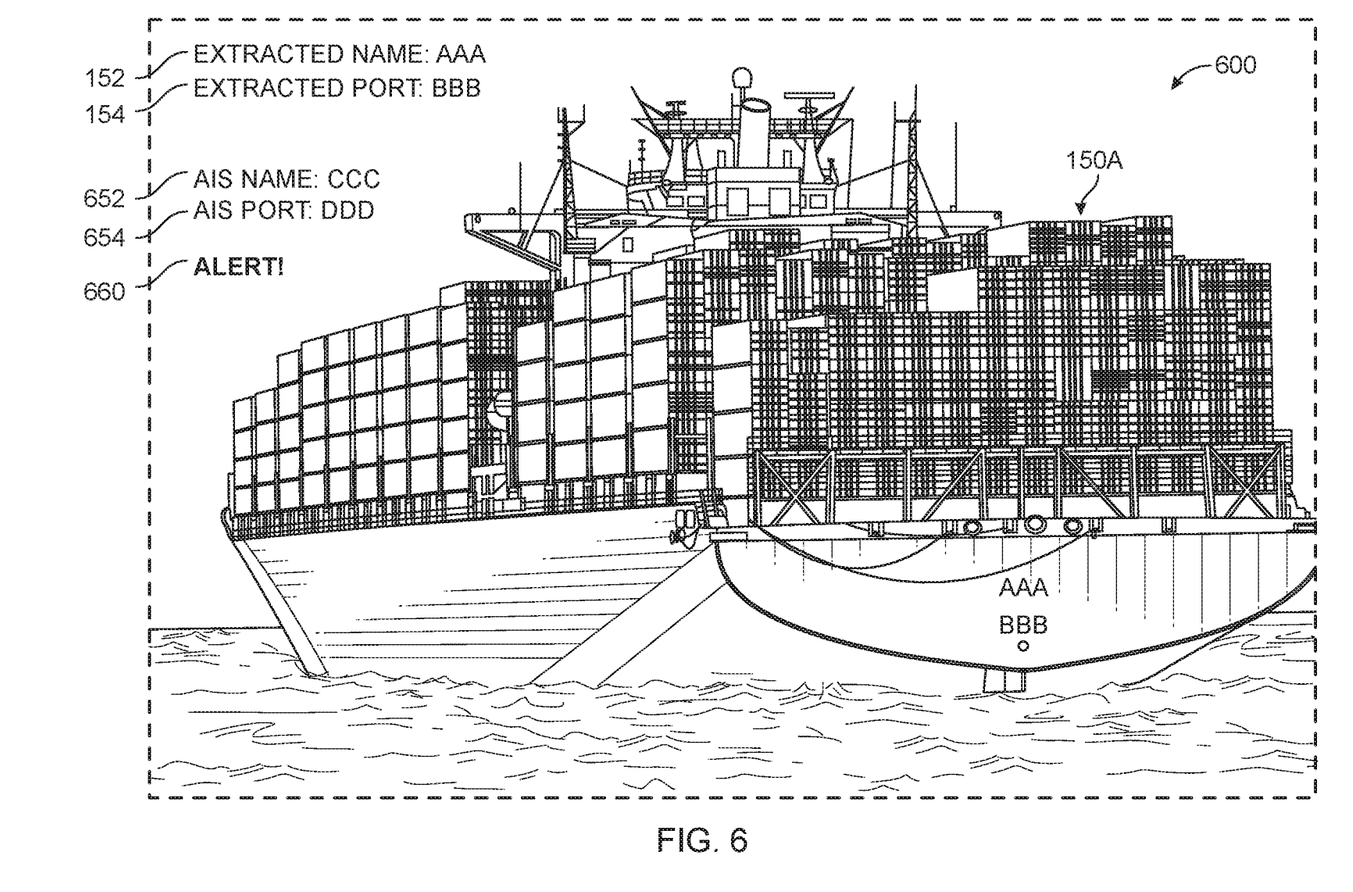
FIG. 6 illustrates a combined image in accordance with an embodiment of the disclosure.

For example, FIG. 6 illustrates an image 600 captured in block 430 after zoom mechanism 208 has been adjusted as discussed. In this case, target 150A fills substantially the entirety of the field of view 114 of imager 202 and consequently fills substantially the entirety of image 600. As a result, the name and port of the vessel are enlarged in image 600 when compared with image 500 and may be more accurately extracted therefrom.

This processor-controlled selective operation of zoom mechanism 208 overcomes challenges posed by conventional slew-to-cue systems in which zoom mechanisms are generally operated manually. By performing the image processing and zoom adjustments discussed herein, system 100 can rapidly configure imager 202 and its associated zoom mechanism 208 to capture high resolution images sufficient for data extraction processing and fast identification of vessels.

In block 445, processor 324 processes the high resolution image captured in block 430 to extract data therefrom. In some embodiments, block 445 may include performing various recognition processes to identify letters, numbers, symbols, indicia, shapes, and/or other information present in the captured images and associated with target 150A. For example, in the case of image 600, the name (e.g., "AAA") and the port (e.g., "BBB") of the vessel may be extracted.

In block 450, processor 324 receives AIS data. As discussed, AIS data may include information provided in AIS transmissions from targets 150 and/or other targets around the world. As such, the received AIS data may include various information including the name, port, geolocation, course, speed, and/or other information associated with target 150A.

In some embodiments, processor 324 may receive the AIS data from database 160. In this regard, processor 324 may select the AIS data from the larger set of AIS data 162 maintained by database 160. For example, processor 324 may select AIS data from database 160 that is associated with the geolocation determined in block 420 (e.g., processor 324 may select and receive specific AIS data that is associated with the geolocation of target 150A). In some embodiments, processor 324 may receive the AIS data wirelessly through a transmission received by antenna 210 (e.g., received directly from target 150A itself or relayed signals originating therefrom).

In block 455, processor 324 generates a combined image using the captured image, the extracted information, and the received AIS data. For example, in some embodiments, processor 324 may overlay the extracted information and the AIS data over the captured image to provide a combined image that permits efficient review by a user. In some embodiments, additional information may be included in the combined image such as a radar echo received during block 410, a target category determined in block 415, a geolocation determined in block 420, and/or other information.

In the example of FIG. 6, image 600 is a combined image that includes the original image of target 150A overlaid with the name 152 (e.g., "AAA") and port 154 (e.g., "BBB") extracted from image 600 and further overlaid with the name 652 ("CCC") and port 654 ("DDD") provided in the AIS data associated with the geolocation of target 150A. In block 460, processor 324 presents the combined image to the user, for example, on display 360.

In block 465, processor 324 compares the information extracted from the captured image in block 445 with the AIS data received in block 450. For example, in the case of target 150A and image 600, block 465 may include comparing the name 152 (e.g., "AAA") and port 154 (e.g., "BBB") extracted from image 600 with the name 652 ("CCC") and port 654 ("DDD") provided in the AIS data associated with the geolocation of target 150A.

If the names 152/652 and/or ports 154/654 differ from each other, then this indicates there is a discrepancy between the target 150A viewed by imager 202 and the AIS data associated with the target's geolocation. This discrepancy may indicate that target 150A is transmitting inaccurate AIS data and may be masquerading as a different vessel. In various embodiments, any desired set or subset of AIS data may be used and compared with the extracted information from captured images to determine whether a discrepancy exists.

If a discrepancy is detected (block 470), then processor 485 generates an alarm (block 475) to alert the user that the imaged target 150A differs from AIS data. In various embodiments, such an alarm may be presented to the user in visual form (e.g., on display 360), in audio form (e.g., by audio component 362), and/or other forms. In the example shown in FIG. 6, an alarm message 660 (e.g., "ALERT!") is provided in the combined image 600 to inform the user that a discrepancy has been determined.

In some embodiments, additional processing may be performed to attempt to identify target 150A and/or detect additional discrepancies. For example, in block 480, processor 324 processes the captured image and/or additional sensor data (e.g., received from any of the various components of multisensor system 110) to determine additional information regarding target 150A. For example, in some embodiments, block 480 may include extracting a shape, profile, and/or three dimensional model of target 150A from the image and/or sensor data. The various information determined in block 470 may be combined to provide a signature associated with target 150A.

As discussed, database 160 may include signature data 164 for specific known vessels. Accordingly, in block 485, processor 324 compares the signature data determined in block 480 with the signature data 164 maintained in database.

If a signature match is found (block 490), then processor 324 may determine the actual identity of target 150A as corresponding to a particular known vessel identified in the signature data 164 (block 495). As a result, processor 324 may successfully identify target 150A even if target 150A is transmitting inaccurate AIS data.

In block 497, processor 324 stores a record of the captured image, the geolocation, the extracted information, the vessel-specific AIS data, the determined signature, and/or the vessel-specific signature data 164. This record may be used for future reference to document the presence of target 150A, its identity, and/or any discrepancies associated therewith.

As discussed, in some embodiments, a plurality of targets may be detected in block 415 (e.g., targets 150A, 150B, 150C). In this regard, if additional targets remain to be processed (e.g., targets 150B and 150C), then the process may repeat blocks 420 through 497 for each of the additional targets. As a result, all targets in the target area 112 may be reviewed by system 100 if desired.

In view of the present disclosure, it will be appreciated that the various techniques discussed herein may be used to ascertain discrepancies between AIS data and actual images captured of vessels in a target area. In addition, even if discrepancies are found, vessels may still be identified using further techniques disclosed herein. As a result, the monitoring of maritime vessels can be significantly improved to detect masquerading vessels and provide users with high confidence in the accuracy of AIS data that has been confirmed through image processing.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
  detecting a maritime vessel in a target area, wherein the detecting comprises: capturing preliminary images of the target area by a camera of a multisensor system, the camera comprising infrared sensors and/or visible light sensors, and
  processing the preliminary images to detect the vessel, and
  selectively adjusting, by a processor in response to the detecting, a pan mechanism, a tilt mechanism, and/or a zoom mechanism to position the vessel in a field of view of the camera;
  capturing, by the camera while the vessel is positioned in the field of view of the camera, an additional image of the vessel, wherein the additional image is a visible light image and/or an infrared image;
  processing the additional image to extract information associated with the vessel; determining a geolocation of the vessel based on a geolocation of the multisensor system, a relative distance between the multisensor system and the vessel, and a direction of the field of view of the camera;
  selecting automatic identification system (AIS) data associated with the vessel, wherein the AIS data is selected based on the determined geolocation of the vessel;
  comparing the extracted information to the selected AIS data; and
  generating an alarm in response to a discrepancy detected by the comparing.

2. The method of claim 1, wherein the AIS data is received from the vessel, wherein the additional image is a visible light image captured by the visible light sensors, the method further comprising: capturing an infrared image by the infrared sensors; and
  processing the infrared image to extract additional information associated with the vessel.

3. The method of claim 1, further comprising: generating a combined image comprising the additional image and the selected AIS data; and displaying the combined image to a user.

4. The method of claim 1, wherein:
  the extracted information comprises a name of the vessel; and the selected AIS data comprises a name associated with the determined geolocation of the vessel.

5. The method of claim 1, further comprising storing the additional image and the selected AIS data to document the detected discrepancy.

6. The method of claim 1, further comprising:
  processing the additional image to determine signature data of the vessel; comparing the signature data of the vessel to a database of known signature data comprising images, shapes, and/or three dimensional models associated with known vessels; and identifying the vessel based on a match detected by the compared signature data.

7. The method of claim 1, wherein the AIS data is received from the vessel and/or from a database separate from the vessel.

8. A system comprising:
  a multisensor system comprising a camera, wherein the camera comprises infrared sensors and/or visible light sensors;
  a pan mechanism;
  a tilt mechanism;
  a zoom mechanism;
  a processor; and
  a memory configured to store instructions executable by the processor to configure the processor to perform a method comprising:
  detecting a maritime vessel in a target area, wherein the detecting comprises: operating the camera to capture preliminary images of the target area, and processing the preliminary images to detect the vessel, selectively adjusting, in response to the detecting, the pan mechanism, the tilt mechanism, and/or the zoom mechanism to position the vessel in the field of view of the camera, capturing, by the camera while the vessel is positioned in the field of view of the camera, an additional image of the vessel, wherein the additional image is a visible light image and/or an infrared image;

processing the additional image to extract information associated with the vessel, determining a geolocation of the vessel based on a geolocation of the multisensor system, a relative distance between the multisensor system and the vessel, and a direction of the field of view of the camera, of the multisensor system, selecting automatic identification system (AIS) data associated with the vessel, wherein the AIS data is selected based on the determined geolocation of the vessel, comparing the extracted information to the selected AIS data, and generating an alarm in response to a discrepancy detected by the comparing.

9. The system of claim 8, wherein the AIS data is transmitted from the vessel, wherein the additional image is a visible light image captured by the visible light sensors, the method further comprising: capturing an infrared image by the infrared sensors; and processing the infrared image to extract additional information associated with the vessel.

10. The system of claim 8, further comprising a display, wherein the method further comprises:

generating a combined image comprising the additional image and the selected AIS data; and presenting the combined image on the display for viewing by a user.

11. The system of claim 8, wherein: the extracted information comprises a name of the vessel; and the selected AIS data comprises a name associated with the determined geolocation of the vessel.

12. The system of claim 8, wherein the method further comprises storing the additional image and the selected AIS data to document the detected discrepancy.

13. The system of claim 8, wherein the method further comprises:

processing the additional image to determine signature data of the vessel; comparing the signature data of the vessel to a database of known signature data comprising images, shapes, and/or three dimensional models associated with known vessels; and identifying the vessel based on a match detected by the compared signature data.

14. The system of claim 8, wherein the AIS data is received from the vessel and/or from a database separate from the vessel.

* * * * *